Aug. 25, 1931.  M. H. TONCRAY  1,820,257
AUTOMOBILE BODY
Filed March 11, 1926   2 Sheets-Sheet 1
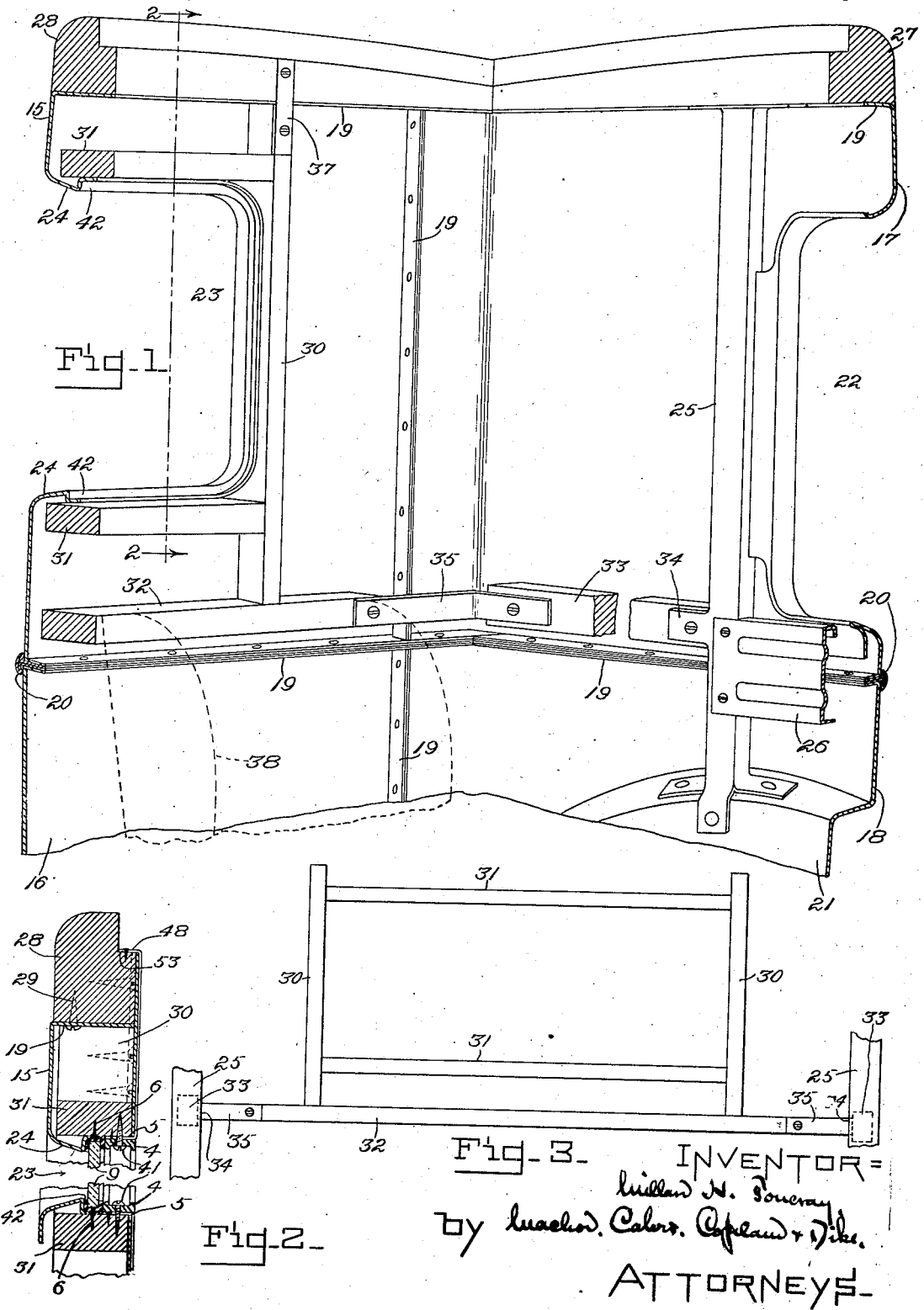

Aug. 25, 1931.  M. H. TONCRAY  1,820,257
AUTOMOBILE BODY
Filed March 11, 1926  2 Sheets-Sheet 2
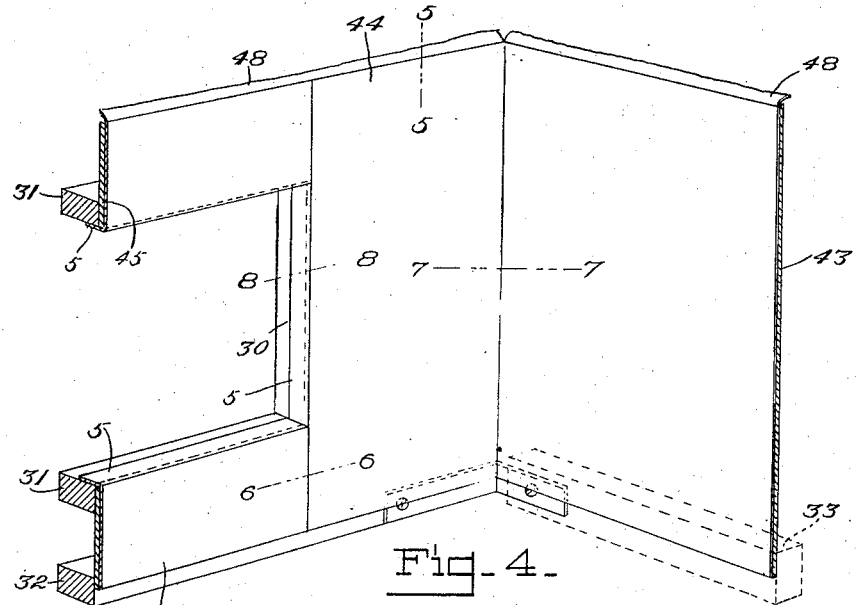
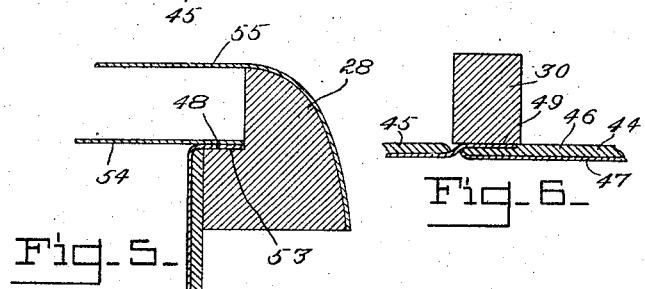
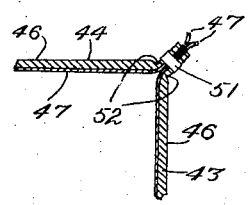
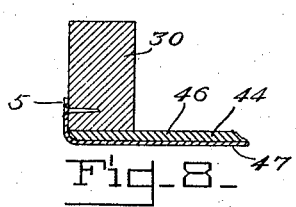

Patented Aug. 25, 1931

1,820,257

UNITED STATES PATENT OFFICE

MILLARD H. TONCRAY, OF DETROIT, MICHIGAN, ASSIGNOR TO HUDSON MOTOR CAR COMPANY, OF DETROIT, MICHIGAN, A CORPORATION OF MICHIGAN

AUTOMOBILE BODY

Application filed March 11, 1926. Serial No. 93,846.

This invention relates especially, although not exclusively, to closed metal automobile bodies of the frameless type and has for its general objects to facilitate the interior trimming of such a body and the mounting of the fixed rear window, as well as to provide improved means for bracing, strengthening, and stiffening the body shell, particularly around the rear window and adjacent the seat back.

The more particular objects of the invention, together with means whereby the latter may be carried into effect, will best be understood from the following description of one form or embodiment thereof illustrated in the accompanying drawings. It will be understood, however, that the particular construction described and shown has been chosen for illustrative purposes merely, and that the invention as defined by the claims hereunto appended, may be otherwise embodied without departure from its spirit and scope.

In said drawings:

Fig. 1 is a fragmentary interior perspective view of one of the rear corners of a closed automobile body, showing the same before trimming.

Fig. 2 is a section, taken substantially on the line 2—2 Fig. 1, showing the rear window glass and trim panels in place.

Fig. 3 is a detail elevation, on a somewhat reduced scale, of the combined rear window brace and trim frame and certain adjacent parts.

Fig. 4 is a perspective view corresponding to Fig. 1 and showing the panels employed in trimming the portion of the body shown in the latter figure, together with the trim frame to which they are secured.

Figs. 5 to 8 are detail sections taken substantially on the line 5—5, 6—6, 7—7 and 8—8, respectively, Fig. 4.

The invention is herein illustrated in connection with a metal automobile body of the type known as a coach and constructed in accordance with principles more fully explained in another application filed November 20, 1925, Serial No. 70,298, although it will be understood that, while certain features of the invention are particularly applicable to such a body, the precise type and construction of the latter may be widely varied. In Fig. 1 is shown the interior of one of the rear corners of such a body, which comprises a self-supporting metal structure, of the frameless type in which the shape of the body is determined and the strains and stresses taken primarily by an exterior metal shell composed of connected, pre-formed panels, as distinguished from composite bodies which comprise a covering of panels applied to a wooden skeleton frame which determines the shape of the body and takes the stresses and strains. In the construction shown, the panel assembly constituting the metal shell includes upper and lower back panels 15 and 16 and upper and lower quarter panels 17 and 18. The quarter panels at one side of the body only are shown in Fig. 1, it being understood that these panels are duplicated in reversed form at the opposite side. The several panels are formed with inturned edge flanges 19, the flanges of adjacent panels being riveted or otherwise secured together with the interposed flange of a combined finishing and stiffening molding 20 to form a panel joint of the character more fully described in an application filed August 15, 1925, by O. J. Groehn Serial No. 50,406, now Patent No. 1,693,750, dated December 4, 1928. In the construction shown, the quarter panels 17 and 18 extend for a short distance about the rear corner of the body where they are connected with the back panels 15 and 16, the lower quarter panels 18 being formed with inset wheel houses 21, the upper quarter panels 17 being formed with quarter window openings 22, and the upper back panel 15 being likewise formed with a rear window opening 23 surrounded by an inturned flange 24. Secured at their lower ends to and extending upwardly from the wheel houses 21 immediately at the rear of the quarter window openings 22 are quarter pillars 25 to which are secured the rear ends of the regulator boards 26 which carry the operating mechanism for the quarter window sashes or panes, not shown. Superimposed upon the body shell is a top having a frame including side and end head rails 27 and 28 secured, as by screws 29, to the top panel flanges 19, the side head rails 27 being further supported on and secured to the tops of the quarter pillars 25.

In accordance with one feature of the present invention there is inserted into and secured in place within a structurally complete body shell, such as that above described, a separate combined interior brace and trim supporting frame which serves to stiffen and reinforce said shell and to which the interior trim can be readily attached. Said frame is preferably composed of wood and as herein shown includes upright members 30 at the sides of the rear window opening 23, horizontal members 31 above and below said window opening and connecting the upright members 30, a third horizontal member 32 below the members 31, connecting the lower ends of the upright members 30 and extending beyond the same, and side rails 33 secured at their forward ends to lugs or ears 34 formed on the quarter pillars 25 and connected at their rear ends to the ends of the horizontal member 32 by metal brackets 35 extending about the corner of the body. The members 30 and 31 surround and engage the flange 24 of the rear window opening 23 and are secured thereto, as by tacks 6. The upright members 30 extend above the upper horizontal member 31 to the rear head rail 28 of the top to which they are secured by straps or brackets 37.

It will accordingly be seen that the frame above described depends from the top of the body, is secured in place about the rear window opening, and is connected at its forward ends with the pillars 25. Said frame serves materially to stiffen and reinforce the body shell in a number of ways. In the first place the lower horizontal member 32 is so located as to serve as a support for the upper edge of the rear seat back, whose position is indicated in dotted lines at 38 in Fig. 1. The upper edge of said seat back rests against the member 32 which relieves the back panels from any rearward thrust, and from which the strains and stresses are transferred, through the brackets 35 and side rails 33, to the pillars 25. The rear portion of the frame also serves to brace and stiffen the upper back panel 15 where the latter is cut away to form the rear window opening 23, said frame serving also as additional means to tie said back panel to the rear head rail 28 of the top and, through the side rails 33 and brackets 35, to the pillars 25.

The portion of the frame surrounding the rear window opening also affords simple and convenient means for mounting the fixed rear window glass 9 which may be inserted into said frame and into engagement with the flange 24 and secured in place against the latter by molding strips 4 secured, as by screws 41, to the wooden frame, the flange 24 being preferably formed with the shoulder 42 to receive said glass.

Another and important purpose of the frame above described is to serve as means for the convenient attachment of the interior trim. Referring to Fig. 4, said trim is preferably applied in the form of interior trim panels, including quarter trim panels 43 extending from the pillars 25 to the rear corners, and back trim panels 44 and 45, the former of which extend from the corners to the sides of the rear window opening, and the latter of which are located above and below said opening. Each of said trim panels is composed of relatively stiff sheet material 46, such as veneer or fibre board, covered with textile or other suitable finishing fabric 47. Adjacent the top, the edge of the fabric 47 is extended beyond the veneer or fibre board backing to provide loose flaps 48 for a purpose presently described. Similarly, the edges of the fabric at the ends of the panels 45 are extended beneath the edges of the adjacent panels 44, as shown at 49 in Fig. 6, while the edges of the fabric on the panels 44 and 45 about the window opening are similarly extended and folded over and tacked or otherwise secured to the frame members 30 and 31, as shown at 5 in Figs. 2, 4 and 8. The adjacent vertical edges of the panels 43 and 44 are hinged together as indicated at 51 in Fig. 7, this being preferably accomplished by scoring the backing sheets 46 adjacent their edges, as shown at 52, and securing the marginal portions together by rivets or other attaching means.

As above pointed out, the combined brace and trim frame, composed of the parts 30, 31, 32 and 33, together with the brackets 35 and 37, is entirely supplementary to the body structure including the metal panels, pillars and other parts, and all of the metal work may, therefore, be completely assembled and finished, as by enameling and baking, before the introduction of any woodwork or fabric into the body. After thus completing the metal body, the wooden top frame 27 and 28 may be superimposed thereupon and the remaining parts assembled as follows: The rear portion of the trim frame, comprising the members 30, 31 and 32 and the brackets 35 and 37, may be conveniently assembled at the bench, thereafter placed in the body about the rear window frame 24, and suspended in place by securing the brackets 37 to the rear head rail 28. The side rails 33 are then cut to size and provided with bolt holes in proper position, as by drilling in a suitable jig, and are then put in place and bolted to the brackets 35 and to the lugs or ears 34 on the pillars 25. The rear window flange 24 is then tacked or otherwise secured to the members 30 and 31. The upper and lower back trim panels 45 are then put in place, the marginal edges 5 of the covering 47 being turned over and tacked to the members 31, the lower edge of the lower panel 45 tacked to the member 32, and the upper marginal edge 48 of the covering of the upper panel turned over a ledge 53 formed on the rear head rail 28 and tacked or otherwise secured thereto. The trim panels 43 and 44 are hinged together as above described at the bench, folded together, and introduced into the body, and are then spread out and secured in place, the lower edges of said panels being tacked to the side rail 33 and frame member 32, respectively, the forward edges of the panels 43 being suitably secured, as by finish strips, not shown, to the pillars 25, the inner edge of each panel 44 being tacked or otherwise secured to the adjacent upright 30, and the upper marginal edges 48 of the covering being secured to the head rails 27 and 28 as above described in connection with the upper back panel 45. The rear window glass is then inserted and secured in place by the strips 4 which also serve to cover the tacked marginal edges 5 of the fabric covering. The inner top lining 54 (Fig. 5) may then be secured in place over the turned marginal edges 48 of the trim panels and secured in place, after which the outside top covering 55 may be stretched over and secured to the top frame in the usual manner.

If preferred, the back trim panels 44 and 45, the former with the upper trim panels 43 hinged thereto, may be secured to the rear portion of the trim frame as shown in Fig. 4 prior to the introduction of said frame into the body and the connection of the brackets 35 with the side rails 33. In order to facilitate this operation, the hinged quarter panels 43 can be folded backwardly over the other parts until the latter are put in place, whereupon said panels 43 may be swung forwardly and secured in place as above described.

Having thus described my invention, I claim:

1. In an automobile body, in combination, an exterior shell composed of back and quarter panels, said back panel having a window opening, pillars at the sides of said shell, a top supported on said shell and pillars; an interior brace or frame comprising a back portion having parts surrounding said window opening and side rails connecting said back portion with said pillars, and back and quarter trim panels secured respectively to the back portion and side rails of said brace or frame, said trim panels being further secured at their upper edges to said top.

2. In an automobile body of the frameless type, the combination with a self-supporting metal structure including side pillars and an exterior shell having a rear window opening, of a separate non-metallic interior brace and trim supporting frame inserted into and secured in place within said shell, said frame having a rear portion surrounding said window opening and side portions extending forwardly from said rear portion and connected with said pillars.

3. In an automobile body, the combination with a self-supporting metal structure including side pillars and an exterior shell having a rear window opening, of a top supported on said shell and pillars, and a separate non-metallic interior brace and trim supporting frame having a rear portion supported by and depending from said top within said shell and surrounding said window opening and side portions extending forwardly from said rear portion and connected with said pillars.

4. In an automobile body, the combination with a self-supporting metal structure including side pillars and an exterior shell having a rear window opening, of a top supported on said shell and pillars, and a separate non-metallic interior brace and trim supporting frame comprising upright members at the sides of said window opening and connected at their upper ends with and supported by said top, transverse horizontal members connecting said upright members above and below said window opening, and forwardly extending horizontal members connecting said upright members with said pillars.

5. A back and quarter trim sub-assembly unit for automobile bodies including a substantially rigid back trim panel and a substantially rigid quarter trim panel connected with said back trim panel by a hinged joint formed at the outer sides of said panels.

6. In an automobile body of the frameless type, in combination, a self-supporting body structure including an exterior metallic shell having portions thereof of relatively greater rigidity than other portions, and a separate non-metallic interior frame or brace secured to one or more of said portions of relatively greater rigidity and spread over certain of said portions of lesser rigidity.

7. In an automobile body of the frameless type, in combination, a self-supporting body structure including an exterior metallic shell having portions thereof of relatively greater rigidity than other portions, and a separate non-metallic interior frame or brace secured to one or more of said portions of relatively greater rigidity and spread over certain of said portions of lesser rigidity, and an interior trim including a back trim panel and a quarter trim panel hinged together and secured to said frame.

In testimony whereof I affix my signature.

MILLARD H. TONCRAY.